(12) United States Patent
Schwierking et al.

(10) Patent No.: US 8,148,669 B2
(45) Date of Patent: Apr. 3, 2012

(54) APPARATUS AND METHOD FOR EFFECTUATING TEMPERATURE CONTROL IN ROLLER GRILLS

(75) Inventors: Roger A. Schwierking, Cheyenne, WY (US); Diosdado G. Pangan, Cheyenne, WY (US); Kenneth P. Gross, Cheyenne, WY (US)

(73) Assignee: APW Wyott Corporation, Cheyenne, WY (US)

( * ) Notice: Subject to any disclaimer, the term of this patent is extended or adjusted under 35 U.S.C. 154(b) by 1188 days.

(21) Appl. No.: 11/933,837

(22) Filed: Nov. 1, 2007

(65) Prior Publication Data

US 2009/0114638 A1  May 7, 2009

(51) Int. Cl.
*H05B 1/02* (2006.01)
(52) U.S. Cl. .......... 219/494; 219/483; 99/441; 99/443 R
(58) Field of Classification Search ................... 219/497, 219/494, 505, 483; 99/441, 442, 443 R, 99/448, 339
See application file for complete search history.

(56) References Cited

U.S. PATENT DOCUMENTS

| | | | |
|---|---|---|---|
| 2,185,979 A | 1/1940 | Dumas | |
| 2,253,434 A | 8/1941 | Kernick | |
| 2,290,572 A | 7/1942 | Rakov | |
| 2,604,842 A | 9/1950 | Dolce | |
| 2,697,395 A | 12/1954 | Steriss | |
| 2,905,076 A | 9/1959 | Del Francia | |
| 3,084,616 A | 4/1963 | Nissen et al. | |
| 3,472,156 A | 10/1969 | Bardeau et al. | |
| 3,590,725 A | 7/1971 | Bilynsky | |
| 3,692,351 A | 9/1972 | Christopher et al. | |
| 3,756,219 A | 9/1973 | Snyder et al. | |
| 3,854,392 A | 12/1974 | Eason | |
| 3,981,233 A | 9/1976 | Nugarus | |
| 4,370,920 A * | 2/1983 | Henriques et al. | ............. 99/339 |
| 4,380,192 A | 4/1983 | Doren | |
| 4,406,861 A | 9/1983 | Beauvais et al. | |
| 4,516,485 A | 5/1985 | Miller | |
| 4,612,684 A | 9/1986 | Kollross | |
| 4,723,482 A | 2/1988 | Weiss et al. | |
| 4,817,585 A | 4/1989 | Craver | |
| 4,913,047 A | 4/1990 | Burley | |

(Continued)

FOREIGN PATENT DOCUMENTS

EP  0 168 985  1/1986

(Continued)

OTHER PUBLICATIONS

"Flouroplastics", published in Modern Plastics Encyclopedia, 1981-1982, discussing polytetraflouroethylne (PTFE).

(Continued)

*Primary Examiner* — Mark Paschall
(74) *Attorney, Agent, or Firm* — David L. Odom; Akin Gump

(57) ABSTRACT

The present invention provides an apparatus and method for effectuating temperature control in roller grill assembly. Some embodiments provide a roller grill assembly which provides enhanced measurement by utilizing temperature probes located in convective air streams generated in the roller tube. Certain embodiments also provide an improved method for maintaining of a food product temperature by utilizing an intermediate holding mode. Finally, certain embodiments provide improved current control by limiting the number of heating circuits of a food heater that may be simultaneously enabled such that the current draw does not exceed a maximum current draw.

9 Claims, 9 Drawing Sheets

U.S. PATENT DOCUMENTS

| | | | |
|---|---|---|---|
| 4,987,827 A | 1/1991 | Marquez | |
| 5,117,748 A | 6/1992 | Costa | |
| 5,211,106 A | 5/1993 | Lucke | |
| 5,458,051 A | 10/1995 | Alden et al. | |
| 5,549,040 A | 8/1996 | Naramura | |
| 5,722,315 A | 3/1998 | Naramura | |
| 5,782,171 A | 7/1998 | Crain et al. | |
| 5,934,182 A | 8/1999 | Harter et al. | |
| 6,045,848 A | 4/2000 | Quinones et al. | |
| 6,079,321 A | 6/2000 | Harter et al. | |
| 6,101,927 A | 8/2000 | Kurmlavaga | |
| 6,152,531 A | 11/2000 | Deceuninck | |
| 6,157,002 A | 12/2000 | Schjerven, Sr. et al. | |
| 6,166,353 A | 12/2000 | Senneville et al. | |
| 6,257,126 B1 | 7/2001 | Veljkovic et al. | |
| 6,283,846 B1 | 9/2001 | Townsend | |
| 6,349,634 B1 | 2/2002 | Delpierre, III et al. | |
| 6,354,193 B1 | 3/2002 | Lee | |
| 6,389,959 B1 | 5/2002 | Robertson | |
| 6,393,971 B1 | 5/2002 | Hunot et al. | |
| 6,401,601 B1 | 6/2002 | Wu | |
| 6,707,015 B2 * | 3/2004 | Huegerich et al. | 219/494 |
| 6,756,068 B1 | 6/2004 | Kafentzis et al. | |
| 6,800,314 B2 | 10/2004 | Evans et al. | |
| 2003/0071501 A1 | 4/2003 | Cruz Fernandes de Pinho et al. | |
| 2003/0197005 A1 | 10/2003 | Huegerich et al. | |
| 2004/0211325 A1 * | 10/2004 | Poland | 99/441 |
| 2005/0061161 A1 * | 3/2005 | Hunot et al. | 99/441 |

FOREIGN PATENT DOCUMENTS

| | | |
|---|---|---|
| EP | 0 364 684 | 4/1990 |
| EP | 0 424 675 | 5/1991 |
| EP | 0 528 575 | 2/1993 |
| EP | 0 777 992 | 6/1997 |
| WO | 00/71010 | 11/2000 |

OTHER PUBLICATIONS

Website Information of Whitford, showing prior art information concerning PTFE (polytetraflouoethylene).

A.J. Antunes & Co., "Roundup Food Equipment Division Owner's Manual Sausage Corral Models SC-20 & SC-40", P/N 1010598 Rev. A Oct. 1996.

A.J. Antunes & Co., "Antune Foodservice Equipment Suggested List Price—Effective Date: May 15, 2008", P/N 1020214 Rev. I May 2008.

Gold Medal Funfood Equipment & Supplies, "Roller Dog Instruction Manual Model #8023EX, #8024EX and Model #8025EX", Part No. 67141EX, Revised Jun. 1996.

Gold Medal Funfood Equipment & Supplies, "Roller Dog Instruction Manual Model #8023, Model #8024 and Model #8025, Model #8023SL, Model #8024SL and Model #8025SL", Part No. 87630, Revised Mar. 2000.

APW/Wyott"Hot Rod Rolling Grills"; Aug. 1995.

Page from a trade magazine (publication date unknown, but product existed prior to Oct. 9 1997), showing APW/Wyott Roller Grill.

"Connolly Roll-A-Grill",(publication date unknown, but products existed prior to Oct. 9, 1997).

"Gold Medal Roller Grill Assemblies", (publication date unknown, products existed prior to Oct. 9, 1997).

"Roundup Hot dog Corrals", (publication date unknown, products existed prior to Oct. 9, 1997).

Trade magazine advertisements showing Gold Medal Products Roller Grill!, Berks Packing Company's Roller Grill, and other products, (publication date unknown, products existed prior to Oct. 9, 1997).

"Watlow Catalog pp.", (publication date unknown, products existed prior to Oct. 9, 1997).

* cited by examiner

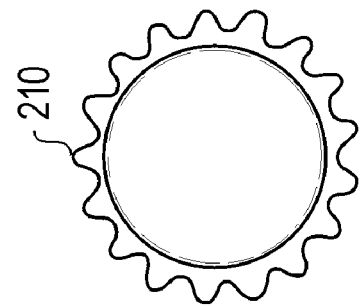
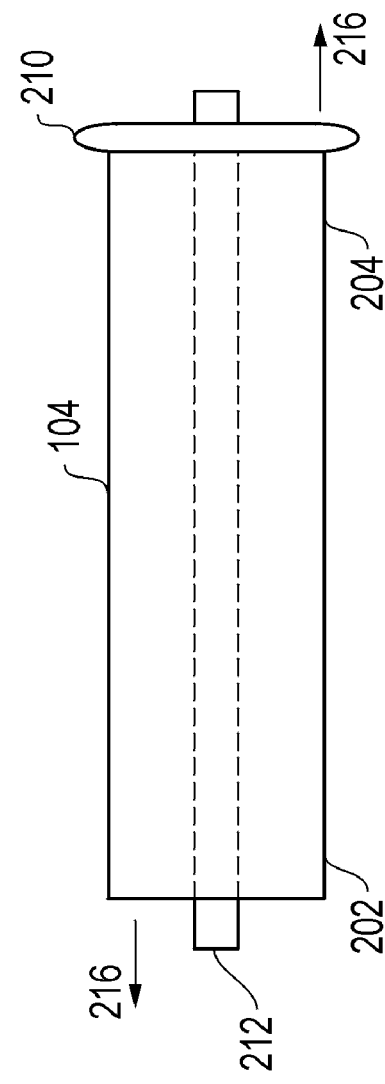

APPARATUS AND METHOD FOR EFFECTUATING TEMPERATURE CONTROL IN ROLLER GRILLS

CROSS-REFERENCE TO RELATED APPLICATIONS

Not Applicable.

TECHNICAL FIELD OF THE INVENTION

The present invention relates generally to cooking assemblies, and more particularly, to an apparatus and method for effectuating temperature control in roller grill assemblies.

BACKGROUND OF THE INVENTION

In conventional roller grill assemblies, an array of roller tubes are rotatably mounted within a housing. Each roller tube may be heated, providing that the heat is then transferred to food placed on the roller tubes.

One drawback of a conventional roller grill assembly is the temperature variance along the length of the roller tubes. A single, homogeneous heating element running along the length of a roller tube generally results in hotter tube surfaces at the middle of the roller tube than at the distal, or outer, ends of the roller tube. Thus, food positioned toward the outer ends of the roller tubes are not heated to the same temperature as food positioned near the middle of the roller tubes. The differences in heating temperatures results in uneven cooking of the food products. Other devices attempt to address this issue by utilizing variable heating elements, or even multiple heating elements. These devices allow for controlled variations of the heating element wattage along the length of the roller tubes. However, these designs also increase the complexity of the device, and thereby increasing the cost, and fail to entirely solve the problem.

Surfaces of the roller tube, near the ends of the tubes provide the most convenient location to mount one or more temperature probes. This configuration results in measurement of a temperature that is inherently offset, or skewed, from the actual temperature of the food products. The temperature skew, or offset, is a direct result of the delay when measuring heat transferred from the food, then to the roller tube surfaces, and finally to the temperature probe through the surface and mounting bracket for the temperature probe. Therefore, the measured temperature is time-delayed based on the time required for the various parts of the system to reach a temperature equilibrium, which rarely happens. As a result, the correlation between the food temperature and the probe-measured temperature is adversely impacted.

The potential to undercook or overcook food due to the wide temperature variations along both the length of the roller tube and over time. The aforementioned delay in translating the temperature variations quickly to the temperature probe makes it difficult to precisely control the heating elements. Therefore, heating elements are frequently turned on too late, or may stay on for too long of a period to maintain a consistent temperature. Therefore, conventional methods of measurement and control are unable to respond accurately and quickly to these temperature variations.

Some conventional roller grill assemblies provide a control that cooks food products initially, while then switching to a hold mode to maintain product temperature at a safe level. The holding temperature is set lower than the cooking temperature to prevent the food products from overcooking, while also maintaining a safe temperature for holding the food. This holding temperature ensures that the quality and safety of the food products over an extended period of time. However, when a conventional roller grill assembly switches from a cook mode to a hold mode, the food products on the roller tubes tend to drop in temperature faster than the measurement probe can detect due to the exposure of the food products to the ambient air and the aforementioned equilibrium delay. This results in food products that may drop below a safe holding temperature for a period of time before the holding mode raises the temperature of the food products above that threshold.

A conventional roller grill assembly may also provide a warming area for related food products, such as a bun warmer for hot dogs. However, the heating of both a series of roller tubes and a warming area can result in a substantially higher current draw than a roller grill assembly without a warming area. This higher current draw requires an end user to provide a larger electrical circuit for powering the roller grill assembly, which can significantly increase the cost of installing such a system and is inefficient since the peak current draw tends to be much higher than the average draw.

Furthermore, roller tubes of a conventional roller grill assembly are generally provided with a smooth finish. However, after the fatty oils of a food product are released during the cooking process, the oils have a tendency to adhere to the outer surfaces of the roller tube. These oils decrease the friction between the roller tube and the food products, which results in food products fail to rotate due to the undesirable slipping of the product on the tubes. Food products that are not evenly turned may cook unevenly and, in certain circumstances, may fail to even reach a safe temperature.

In view of the foregoing, there exists a need for a roller grill assembly that provides more accurate and responsive heating temperature control than the prior art systems. There also exists a need for a roller grill assembly that provides even and effective heating along the entire length of the roller tubes. Additionally, there exists a need for a method of limiting current draw in different heating areas of a roller grill assembly, such as a cooking area and a warming area, enabling the use of smaller electrical circuits for operation. Furthermore, there exists yet another need to provide improved surfaces for roller tubes in a roller grill assembly, to prevent undesirable sliding or slipping of the food products. The present invention addresses these needs.

SUMMARY OF THE INVENTION

The present invention provides an apparatus and method for effectuating temperature control in roller grill assemblies. In one disclosed embodiment, a roller grill assembly comprises a housing; and an array of roller tubes, rotatably mounted with the housing. A convective air condition is created within each roller tube, when the roller tube is heated. Probes are mounted in the air streams of the array of roller tubes, the probes adapted to measure heating temperature of the roller tubes.

One aspect of the present invention provides a roller grill assembly having a housing and an array of a plurality of roller tubes. Each of the roller tubes is rotatably mounted to the housing and is substantially hollow. Each roller tube defines a first opening at one end of the roller tube and a second opening at a second end of the roller tube. Furthermore, each roller tube is provided with a heating element coupled thereto, which heats the outer surface of the roller tube. Additionally, a restrictor is placed in close proximity to the first opening of the roller tubes such that the restrictor substantially covers each of the first ends of the roller tubes and generates a convective air stream within each roller tube.

In some embodiments of the present invention, a plurality of measuring probes are located inside one or more of the roller tubes. Preferably, at least two measuring probes may be provided in a single roller tube and used in combination to determine the temperature of the roller tubes. Furthermore, in some embodiments the roller tubes are positioned at one or both ends of the hollow roller tubes, and preferably near the central axis of the roller tube away from the outer surface to improve measurement readings.

In some embodiments of the present invention, the roller tubes of the roller grill assembly may be divided into one or more heating zones, such as a first heating zone and a second heating zone. In these embodiments, it is contemplated that the one or more heating zones may be individually controlled.

Another aspect of the present invention provides an improved method for maintaining food product temperature in a food heater, such as a roller grill assembly. This method begins by exiting a cooking mode, which cooked the food at a cooking temperature. After the cooking mode, an intermediate holding mode is entered. In the intermediate holding mode, the food heater attempts to maintain the food product at an intermediate holding temperature for an intermediate holding time period. The intermediate holding temperature may be the average of the cooking temperature and a final holding temperature while the intermediate holding time period may be a fixed time, such as 10 minutes. The intermediate holding mode may require setting the intermediate holding temperature and intermediate holding time. As long as the intermediate holding time has not elapsed, which terminates the intermediate holding mode, a measured temperature is compared against the intermediate holding temperature. If the measured temperature is less than the intermediate holding temperature, a heating unit of the food heater is turned on. On the other hand if the measured temperature is greater than the intermediate holding temperature then a heating unit of the food heater is turned off.

Another aspect of the present invention provides a method for improved current control in a food heater having multiple heating circuits. According to this aspect of the present invention, embodiments may be provided with multiple heating circuits, each individual heating circuit drawing a certain amount of current when enabled. Furthermore, a maximum total current draw is provided, where a individual heating circuits can only be enabled if the individual current draw of the heating circuit plus the individual current draw of each of the enabled heating circuits is less than the maximum current draw. In some embodiments, certain heating circuits may be given a higher priority level than other circuits, such that lower priority heating circuits may be disabled to enable a higher priority level heating circuit if enabling both circuits would exceed the total current draw. Such an aspect is especially applicable to a roller grill assembly, such as one having one or more array of roller tube heating circuits and a warming oven, or area, heating circuit.

The following description and drawings set forth in detail a number of illustrative embodiments of the invention. These embodiments are indicative of but a few of the various ways in which the present invention may be utilized.

BRIEF DESCRIPTION OF THE DRAWINGS

A more complete appreciation of the present invention is provided by reference to the following detailed description of the appended drawings and figures. The following description, in conjunction with the appended figures, enables a person having skill in the art to recognize the numerous advantages and features of the present invention by understanding the various disclosed embodiments. The following figures are utilized to best illustrate these features:

FIG. 3A depicts a roller tube of the roller grill assembly having a sprocket on one end according to one embodiment of the present invention;

FIG. 3B depicts a front view of the sprocket in FIG. 3A;

DETAILED DESCRIPTION OF THE INVENTION

The following discussion is presented to enable a person skilled in the art to make and use the present invention. The general principles described herein may be applied to embodiments and applications other than those specifically detailed below without departing from the spirit and scope of the present invention. Therefore, the present invention is not intended to be limited to the embodiments expressly shown, but is to be accorded the widest possible scope of protection consistent with the principles and features disclosed herein.

Figure 1:
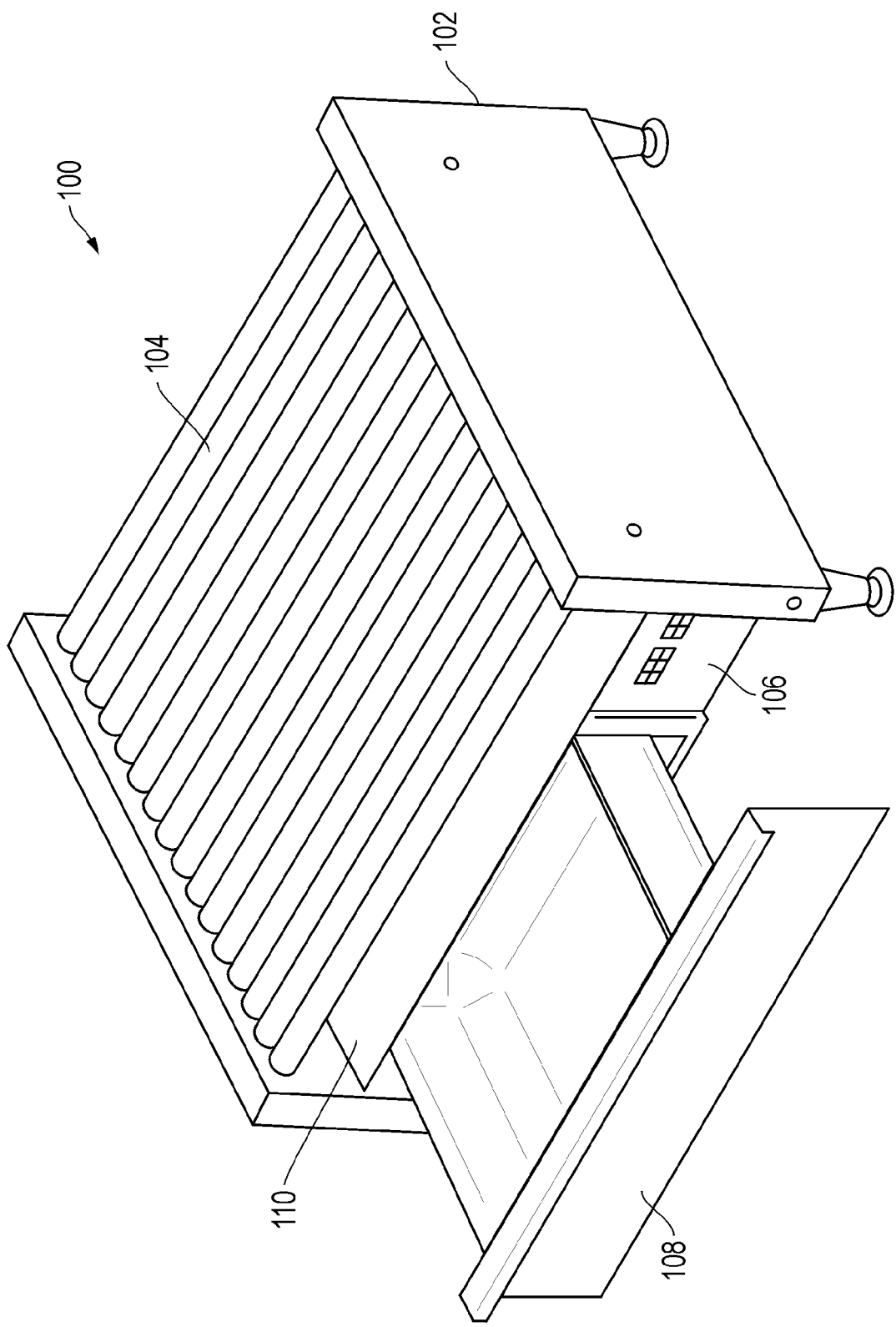
FIG. 1 depicts a perspective view of a roller grill assembly according to one embodiment of the present invention.
Figure 2:
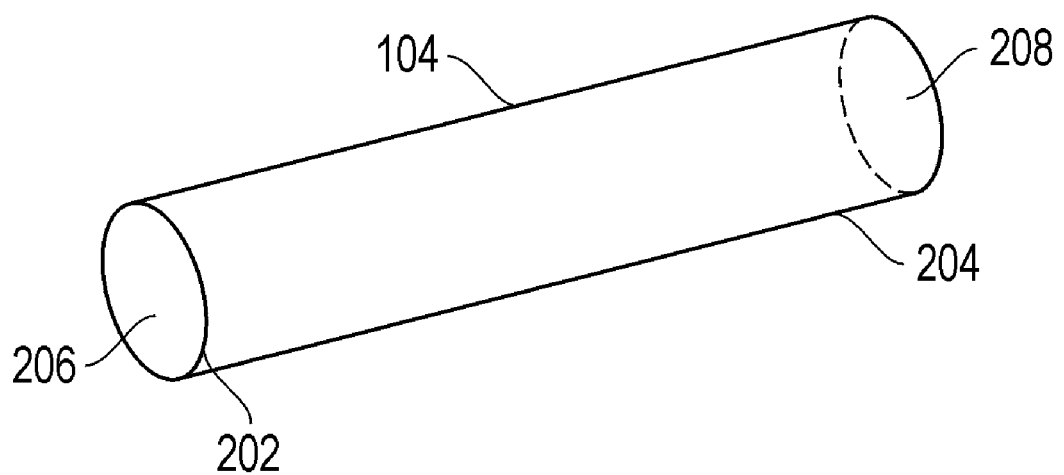
FIG. 2 depicts a roller tube of the roller grill assembly according to the embodiment of the present invention.

Referring first to FIG. 1, a roller grill assembly 100 is illustrated according to one embodiment of the present invention. The roller grill assembly 100 has a housing 102, a plurality of roller tubes 104 rotatably mounted in the housing 102, a control panel 106, a warming tray 108, and a drip pan 110. A heating system (not shown) is used to heat the plurality of roller tubes 104. The heat is then transferred to food products which placed on top of the plurality of roller tubes 104.

Referring now to FIGS. 2, 3A, 3B and 4, each of the plurality of roller tubes 104 has a generally cylindrical shape.

Each roller tube 104 is provided to heat and cook food products that have a generally cylindrical shape, such as a sausage or a hot dog. Each roller tube 104 features a first end 202 and a second end 204, wherein the respective ends 202 or 204 of the roller tube 104 have openings 206 and 208 that permit the free flow of air into and out of the roller tube 104 and through the entire length of the roller tube 104.

The roller tube 104 may be manufactured using any one of various materials known to be useful for conducting heat to a food product while generally maintaining a desired temperature. One example is a roller tube 104 constructed from a metal coated with a material with a low coefficient of friction, such as polytetrafluoroethylene, commonly known by the trade name Teflon®. The low-friction coating makes the roller tubes 104 easy to clean in a commercial application. Each roller tube 104 may be constructed to have any desired length and diameter. A roller grill assembly 100, as shown in FIG. 1, may then have any number of generally matching roller tubes 104, thereby providing an unlimited number of cooking surface configurations depending on the desired capacity. For example, a roller grill assembly 100 in FIG. 1 may utilize a total of eleven parallel roller tubes 104, with each tube being approximately 13 inches in length. In another embodiment, a roller grill assembly 100 may have eighteen roller tubes 104, each tube being 34 inches in length.

Figure 4:
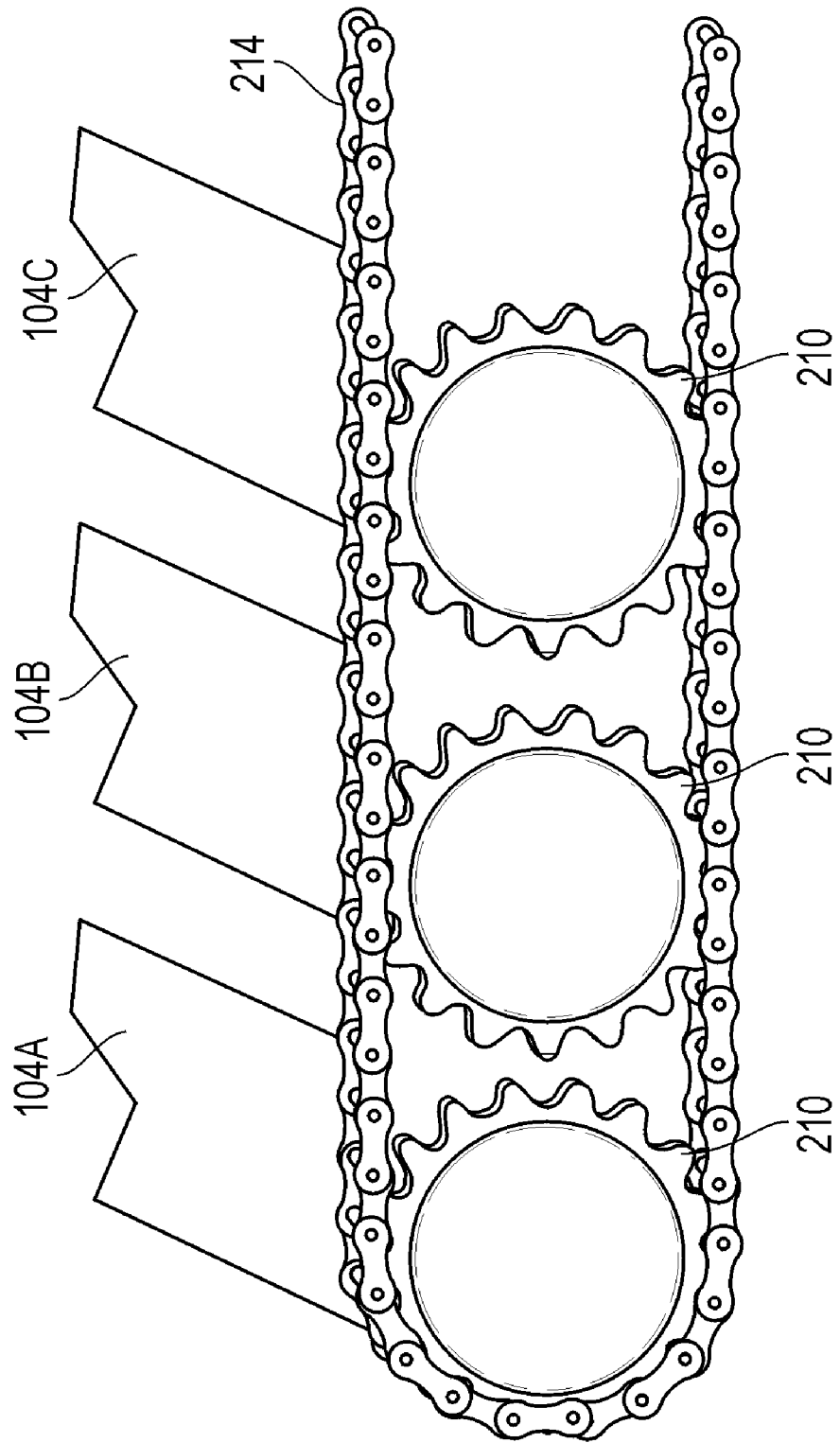
FIG. 4 depicts an array of roller tubes of the roller grill assembly, each with a sprocket engaged with a drive element, according to one embodiment of the present invention.

Each roller tube 104 may be optionally provided with a sprocket 210 attached along an outer perimeter of the roller tube 104, generally at one of the respective ends 202 or 204. Looking at FIG. 3A, a roller tube 104 is depicted with a sprocket 210 located at the second end 204. FIG. 3B better illustrates a typical front view of such a sprocket 210. FIG. 4 depicts a set of parallel roller tubes 104 with sprockets 210 designed to engage a drive element 214, such as the depicted drive chain. In this preferred embodiment, the drive element 214 ensures that each of the roller tubes 104, such as roller tubes 104A, 104B and 104C, rotate in parallel and in a single direction.

Referring back to FIG. 3A, a heating element 212 is provided inside each roller tube 104 to heat the roller tube 104. In the preferred embodiment, the heating element 212 is coaxial with the roller tube 214 and therefore directly heats the air within the roller tube 104 which in turns heats the outer surface of the roller tube 104. However, it is contemplated that in some embodiments it may be desirable to provide other types of heating elements 212 in different configurations, such as adjacent to the outer wall of the roller tube 104. Furthermore, in some embodiments, the heating element 212 may be longer than the roller tube 104, as depicted in FIG. 3A, to provide one or more electrical connections located outside of the roller tube 104.

As the heating element 212 heats the air inside the roller tube 104, the air has a tendency to expand and flows out of the ends of the roller tubes 104 as depicted by arrows 216 shown in FIG. 3A. Therefore, in conventional roller grill assemblies, roller tubes 104 with open ends allow heat to escape unevenly. Thus, even though the air may transfer some of its heat to the outer surfaces of the roller tube 104, the distal ends of the roller tubes 104 may have a lower temperature than the central portion of the roller tubes 104. This variation in temperature along the length of the roller tube results in uneven and unpredictable cooking of the food products.

Figure 5:
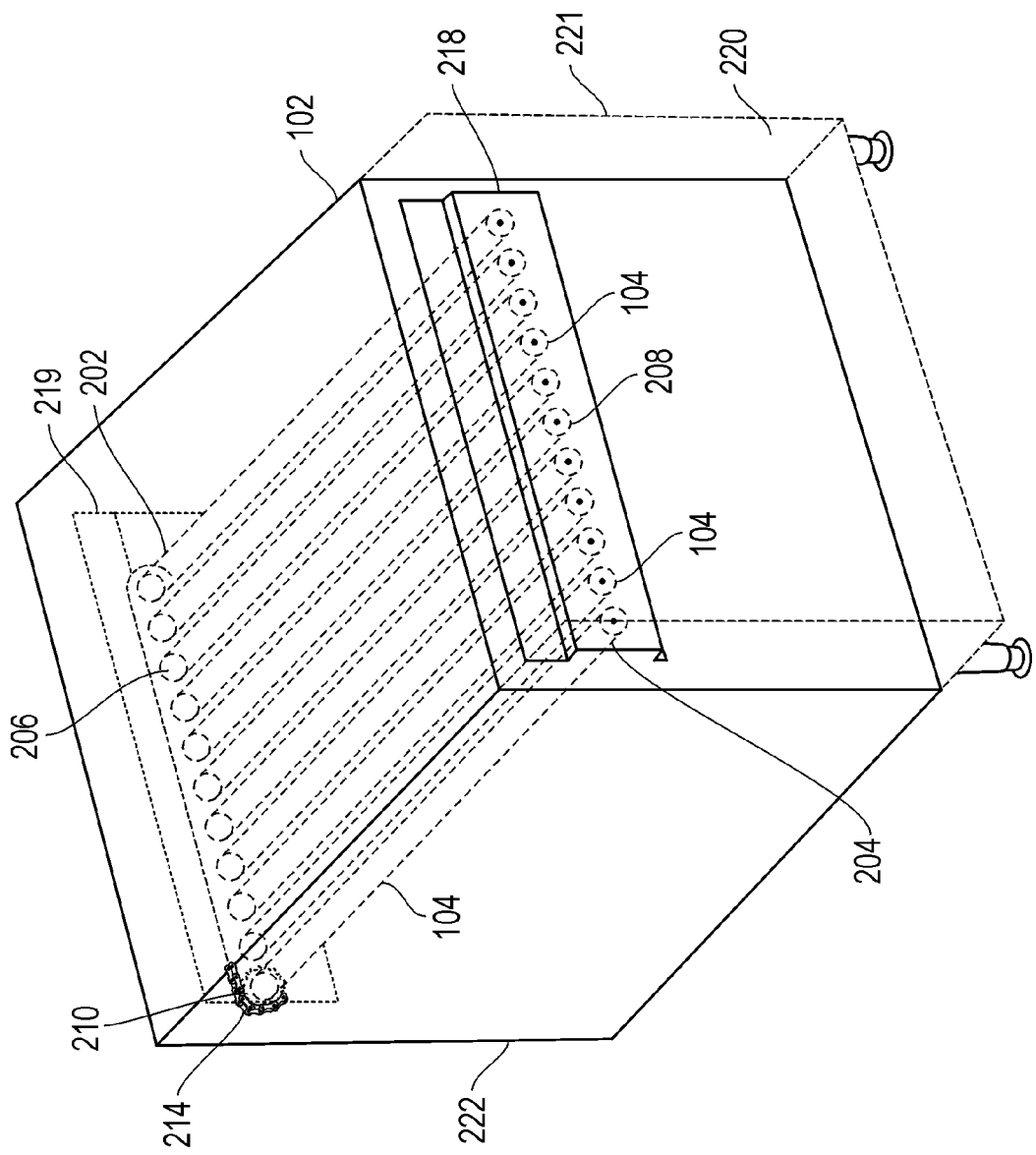
FIG. 5 depicts an array of roller tubes of the roller grill assembly, with the openings of the roller tubes at both sides covered by a sheet metal cover, respectively, according to one embodiment of the present invention.

Embodiments of the present invention provide a more even distribution of the heated air by utilizing controlled, convective air streams which are created within each roller tube 104. In one embodiment of the present invention, one or both ends of the roller tube 104 may be restricted, although each restriction can be to varying degrees. FIG. 5 illustrates one possible embodiment of the present invention as contemplated.

In FIG. 5, a roller grill assembly is depicted as contemplated by one embodiment of the present invention for providing a convective air current through the roller tubes 104 As with most general roller grill assemblies, an array of roller tubes 104 are mounted between the first side 220 and the second side 222 of a housing 102. All of the roller tubes 104 are provided with sprockets 210 at the end of the respective roller tube 104 closest to the second side 222. A drive element 214 is then provided for the array of roller tubes 104, such as a chain drive. The drive element 214 causes each of the roller tubes 104 to rotate at the same speed during operation. Each of the roller tubes 104 at the second end has an unrestricted opening 206.

In some embodiments, a second end cover 219 may be provided to cover all or part of exposed components on the second side 222 of the roller grill assembly. The second end cover 219 may be manufactured of any material that is suitable for use in a roller grill assembly to provide a general enclosure to cover the operating components. Ideally, this second end cover 219 would not absorb the majority of the heat of the roller grill assembly so it would be safer for general use and to prevent combustion of any products in close proximity. However, the second end cover 219 does not generally affect the flow of the air through the roller tubes 104 in any significant way.

The first side 220 of the housing 102 of the roller grill assembly also has several exposed components. In particular, each of the roller tubes 104 is exposed at the first side 220 of the housing 102, and therefore the second opening 208 of each roller tube 104 is exposed. In embodiments of the present invention, a restrictor plate 218 is placed in close proximity to the end of the series of roller tubes 104 to restrict the flow of air out of the roller tubes 104 through the opening. In particular, the restrictor plate 218 may be placed as little as 2 millimeters away from the second opening 208 of the roller tubes 104 or as much as several centimeters away. The restrictor plate 218 restricts the flow of air out of the tube, and in turn creates a convection effect as a natural result.

Other embodiments also anticipate that the restrictor may incorporated into the roller tubes. For example, an insert may be used to cover part of the opening at one or both ends of the roller tube. Furthermore, it is also contemplated that a restrictor plate may also be used at the second end of the housing 102 depending on the desired configuration. The various convection effects resulting from configurations having different temperatures, different roller tube diameters, and other adjusted variables may be more desirable for a particular application. Therefore, the present invention is intended to embody all such configurations that are commensurate with the spirit of the particular embodiment described with respect to FIG. 5.

By applying restrictions to the openings of the roller tubes 104, a natural convective air stream is provided throughout each roller tube 104, reducing the temperature variances along the length of the roller tubes 104. The convective air stream may also be created by utilizing external forces, such as a fan, a baffle, or other mechanical means, which may be referred as forced convection. Other methods may also be applied to create convective air streams throughout each roller tube 104 without departing the scope and spirit of the present invention.

Another aspect of the present invention is the mounting of temperature probes in certain embodiments. Temperature probes are mounted to measure the heating temperature of the food products. Thus the temperature probes are used to control the heating element 212 depicted in FIG. 3A. Looking at FIG. 6, an embodiment of the present invention illustrates an array of roller tubes 104 with four probes: a first probe 224, a second probe 226, a third probe 228, and a fourth probe 230. Each probe 224, 226, 228, and 230 is mounted in the air stream of a roller tube 104.

Figure 6:
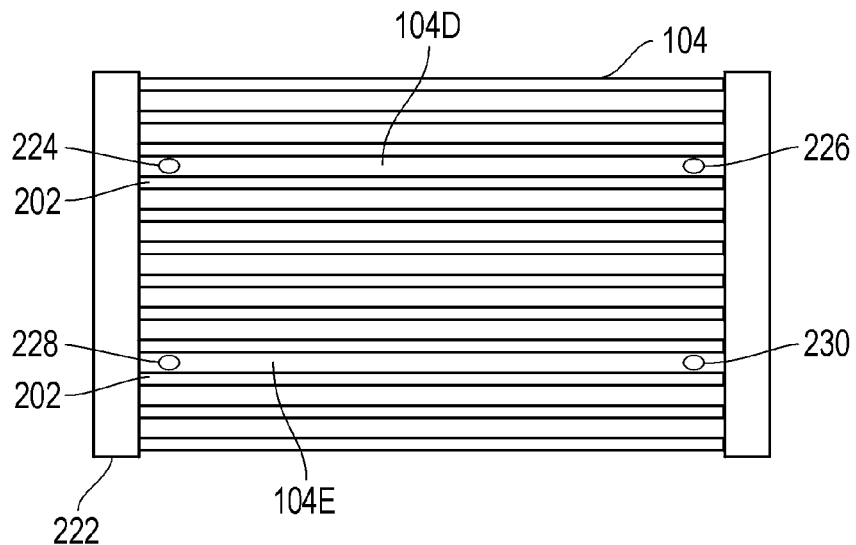
FIG. 6 depicts an array of roller tubes of the roller grill assembly with four probes mounted in the air streams of the roller tubes according to one embodiment of the present invention.

In the embodiment depicted with respect to FIG. 6, the first probe 224 and the second probe 226 are mounted in a single roller tube 104D. Similarly, the third probe 228 and the fourth probe 230 are also mounted in a single roller tube 104E. Each probe 224, 226, 228, 230 is preferably mounted in the air stream to measure the air temperature with the heat from the ends of the roller tubes 104D and 104E having as little effect as possible on the measured temperature. This is facilitated by mounting the measuring probe 224, 226, 228, and 230 toward the central axis of the roller tube 104D and 104E, possibly using a mount that does not conduct heat effectively.

Mounting temperature probes in air streams to measure heating temperature of a roller grill assembly is more advantageous compared with conventional methods which tend to indirectly measure the outer surface of the roller tube by mounting the temperature probe onto a sheet metal bracket that generally center the heating element of the roller tube. As a result, the conduction and dissipation of heat to outside influences creates a measurement error. Therefore, the conventional methods provide less accurate measurement of heating temperature of a roller grill assembly. Comparatively, the embodiment in FIG. 6 provides a more accurate representation of the temperature of roller tube 104 surface which is directly correlated to the convective air stream temperature. Therefore, the food temperature can be more accurately determined in this particular embodiment compared to prior art configurations. This allows for quicker response time to temperature changes caused by placing food products on the roller tubes 104 by reducing temperature overshoot or undershoot.

The depicted embodiment may use two probes in the same roller tube, such as probe 224 and probe 226 in roller tube 104D to average the temperature in the tube. In particular, temperature data such as temperature differences, average temperature, and weighted average temperature, may be calculated by using the pair of probes 224 and 226. Again, this temperature date may be used to provide more accurate control of the roller grill assembly. This further results in faster temperature recovery plus a more even heating temperature across the surface of the roller grill. In some embodiments, including the calculations from probe 228 and probe 230 may further increase the ability to accurately control the roller grill assembly when a single temperature is desired across the entire surface. However, in other embodiments, probe 228 and 230 may be used to measure and control the lower half of the roller grill assembly to provide a different temperature than the upper half of the roller grill assembly.

Figure 7:
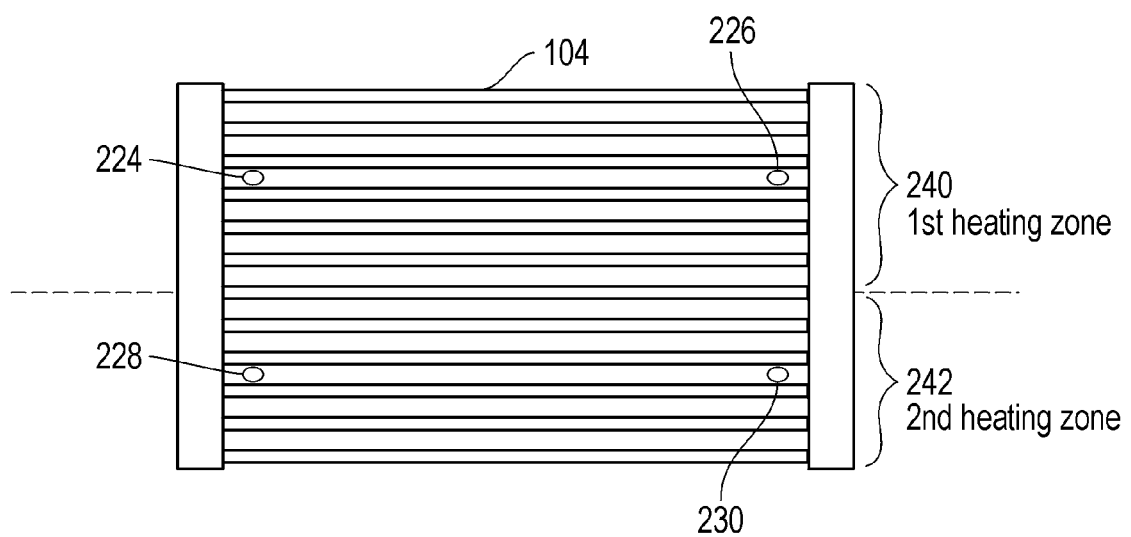
FIG. 7 depicts an array of roller tubes of the roller grill assembly, with four probes mounted in two heating zones of the roller tubes, respectively, according to one embodiment of the present invention.

Looking now at FIG. 7, a more detailed illustration of an array of roller tubes 104 of the roller grill assembly 100 being divided into two heating zones, with two probes mounted in each of the heating zones, according to another embodiment of the present invention. The roller tubes 104 are divided between a first heating zone 240 and a second heating zone 242 separated by a dashed line. The first probe 224 and second probe 226 are mounted in the first heating zone 240, while the third probe 228 and fourth probe 230 are mounted in the second heating zone 242. As previously described with reference to FIG. 6, the probes may be mounted in the air streams of the roller tubes 104.

The first heating zone 240 and the second heating zone 242 may have different temperature requirements. Therefore, having probes 224 and 226 in a different zone than 228 and 230 allows the temperatures of the respective heating zones 240, 242 to be controlled independently. Furthermore, it is possible for one heating zone 240 to be used to cook food products while a second heating zone 242 is used only to hold food products at a serving temperature. Obviously, a person having ordinary skill in the art would recognize that this configuration can be further modified to add additional probes and additional heating zones as desired.

It is desirable in nearly every roller grill assemblies or other food cooking device to maintain food products at or above 140 degrees Farenheit for safety reasons. After cooking a food product, many conventional roller grill assemblies switch from a cooking mode to a holding mode to prevent overcooking of the product, but to maintain a safe temperature. Therefore, this switch from one mode to another means lowering the operating temperature of at least some of the roller grills of a roller grill assembly. A conventional method for achieving the process is best explained with reference to FIG. 8.

Figure 8:
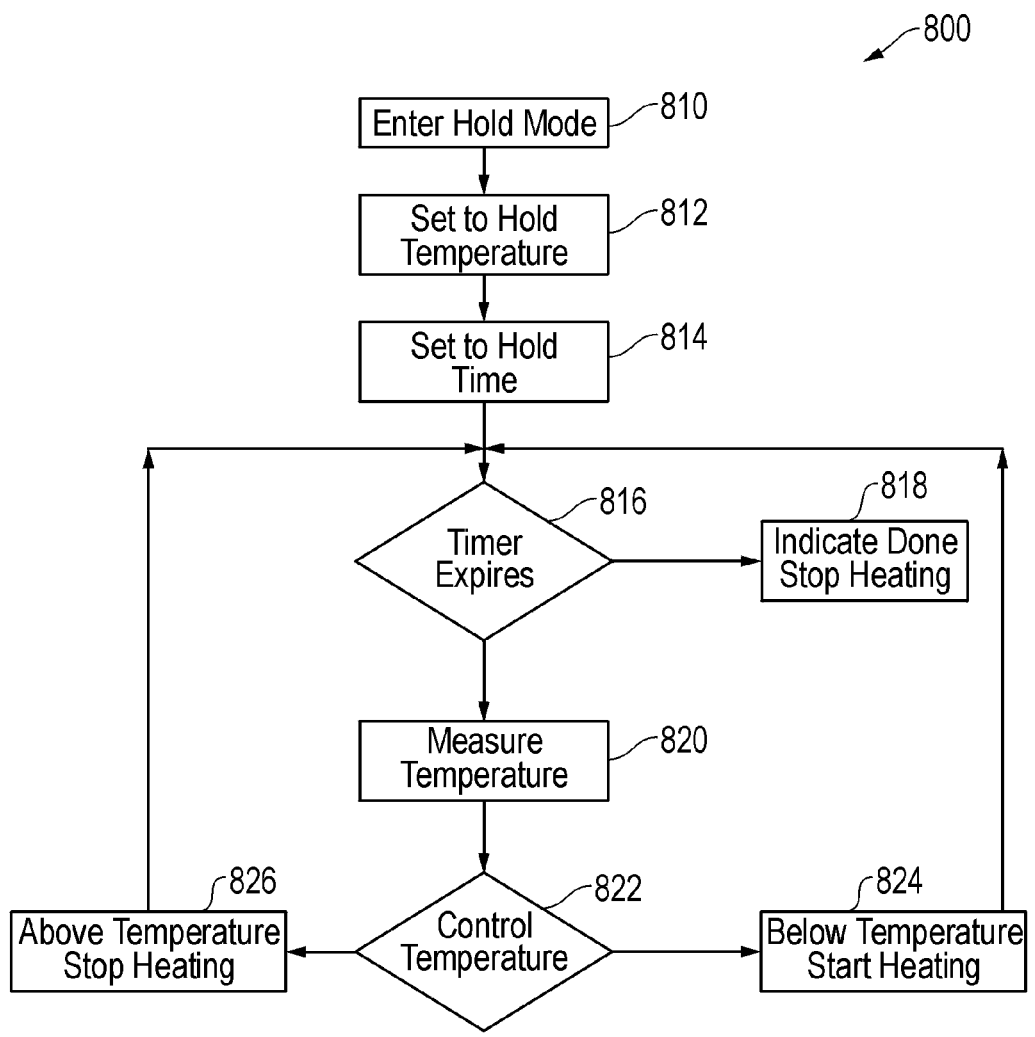
FIG. 8 depicts a flow chart illustrating a conventional method of temperature control when changing from a cook mode to a hold mode as known in the prior art.

Looking at FIG. 8, a flowchart explaining the conventional roller grill mode, the conventional hold mode 800. First, the controller enters "hold mode" at 810 where the "holding temperature" is set at step 812 for the roller grill and a "hold time" is set at step 814. After setting the initial parameters in steps 812 and 814, the conventional hold mode 800 goes through a repetitive process that starts by determining if the timer has expired at step 816, i.e. the total hold time thus far exceeds the "hold time" set in step 814. If so, the conventional hold mode 800 terminates at step 818 and all heating is stopped indefinitely. On the other hand, if the timer has not expired as determined at step 816, the temperature of the food products is measured at step 820 as previously described. This measured temperature is compared at step 822 against the hold temperature originally set at step 812. If the measured temperature is higher than the control temperature, then the heating is temporarily suspended at step 826. On the other hand, if the measured food temperature is below the control temperature, heating of the roller grill heating elements is resumed at step 824. Regardless of the result at step 822, after the comparison and subsequent step 824 or 826, the process returns to determining if the timer expired at step 816.

The "conventional hold mode" 800 depicted in FIG. 8 basically works by turning the heating elements of the roller grill assembly on and off depending on the measured temperature, and whether it is above or below the "hold temperature." This process is well-known, but has disadvantages discussed previously. Specifically, it is known that the measured temperature is not entirely accurate as a result of the variations between the food product temperature and the measuring probe temperature, generally due to the delay in the heat of the food product quickly transferring to the measurement probe. This delay results in undershoot or overshoot of the food product, so it is not necessarily maintained at the desired "holding temperature." This effect is most pronounced in the period immediately following cooking mode, when the temperature of the food product may drop significantly below the desired "holding temperature."

Figure 9:
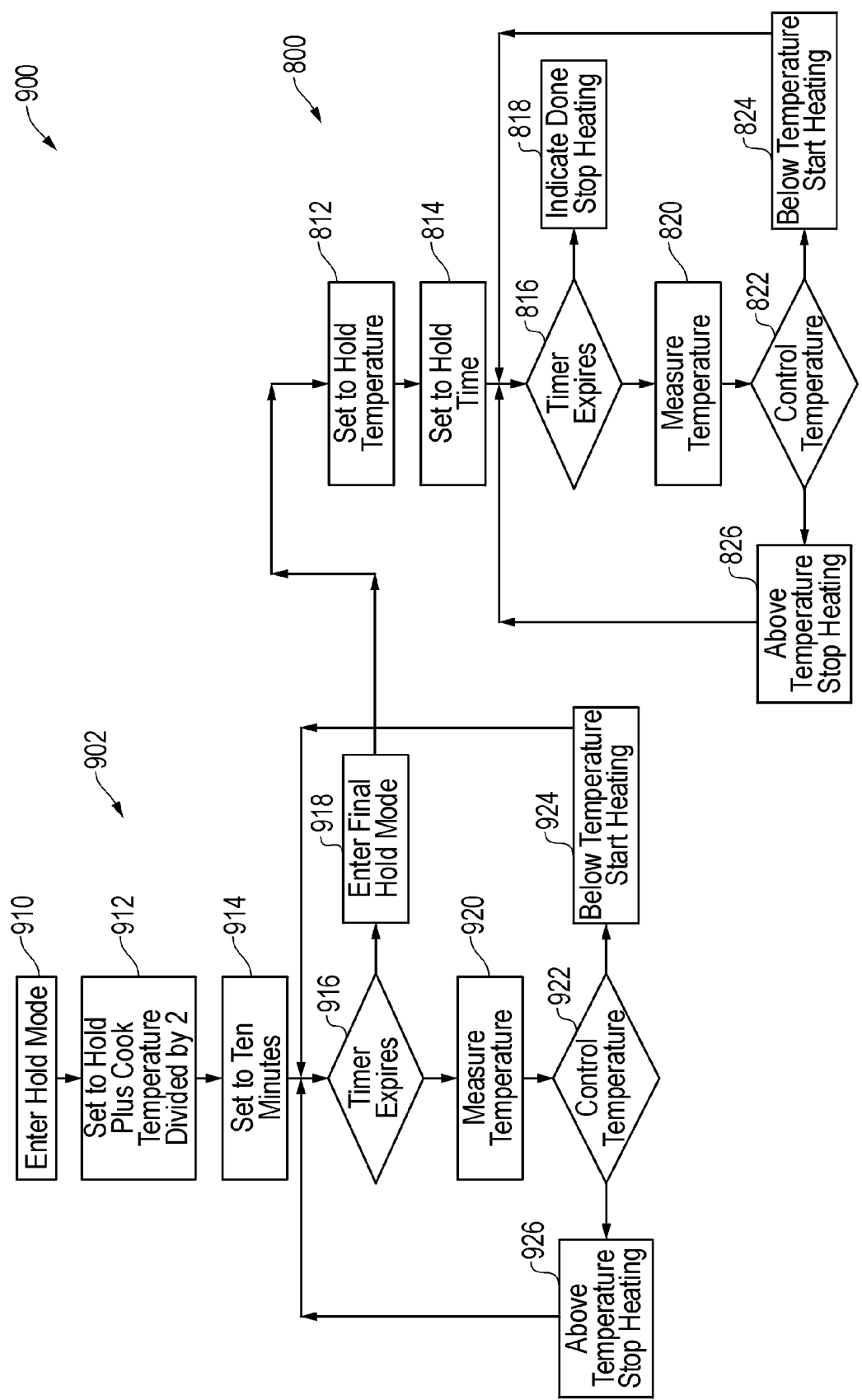
FIG. 9 depicts a flow chart illustrating a method of temperature control when changing from a cook mode to a hold mode according to one embodiment of the present invention.

Therefore, embodiments of the present invention provide an "advanced holding mode" 900, the flowchart of which is depicted in FIG. 9. First, the controller enters "advanced hold mode" at 910. The first two steps are to set an "intermediate holding temperature" at step 912 and an "intermediate holding time" at step 914. The "intermediate holding temperature" is a temperature somewhere between the cooking temperature and the "final holding temperature." In the depicted embodiment, the "intermediate holding temperature" is set to the average of the cooking temperature and the "final holding temperature," while the "intermediate holding time" is set to 10 minutes.

As in FIG. 8, the process continues by determining first if the "intermediate holding time" has elapsed at step 916. If the "intermediate holding time" has not elapsed, the process continues by measuring the temperature 920 as previously described with respect to step 820 of FIG. 8. However, at step 922 the measured temperature is compared against the "intermediate holding temperature" rather than the "final holding temperature." If the measured temperature is higher than the "intermediate holding temperature," then the heating is temporarily suspended at step 926, while the heating is resumed at step 924 if the measured temperature is lower than the "intermediate holding temperature." Thereafter, the process returns to step 916 and continues until the "intermediate holding time" has elapsed, wherein the "advanced holding mode" enters the "final hold mode." The "final hold mode" is identical to the process described with respect to FIG. 8.

The method described with respect to FIG. 9 keeps the food product from dropping below the 140° F. safe food holding temperature for any significant period of time, because the initial risk of overshoot of the "intermediate holding temperature" will not result in a minimum temperature as low as if the "final holding temperature" was used in the initial sequence. Other methods may also be applied without departing the spirit and scope of the present invention. With convective air streams created throughout each roller tube 104 and probes mounted in air streams of the roller tubes 104, an even more accurate, faster temperature measurement and heat control may be obtained using the described temperature control method in the present invention.

FIGS. 10A, 10B, 10C and 10D illustrate embodiments of a roller tube 104 of the roller grill assembly 100 with various textures provided on a portion or all of the outer surface of the roller tube 104. Because certain food products are difficult to rotate properly when placed on a roller tube 104, providing a texture for the roller tubes 104 results in a rough, exterior surface that prevents the food products from skidding. This encourages better rotation of the food products, thus more evenly heated food products.

Figure 10A:
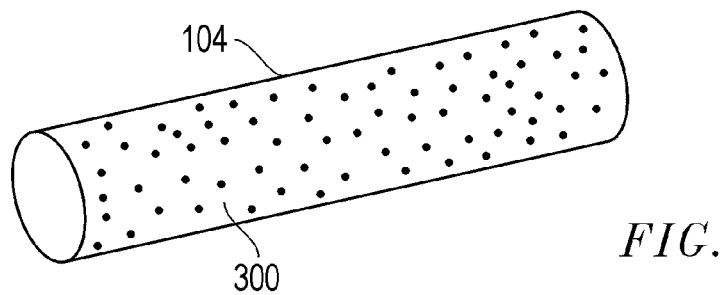
FIG. 10A depicts a roller tube with a blasted sand texture on the exterior surface according to one embodiment of the present invention.
Figure 10B:
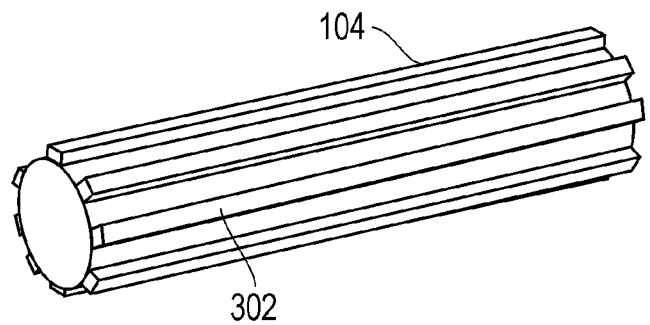
FIG. 10B depicts a roller tube with a ridged texture on the exterior surface according to one embodiment of the present invention.
Figure 10C:
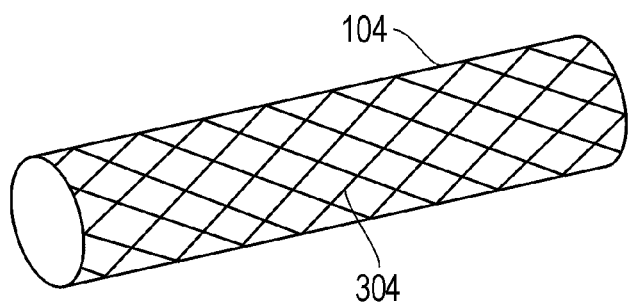
FIG. 10C depicts a roller tube with a hex patter texture on the exterior surface according to one embodiment of the present invention.
Figure 10D:
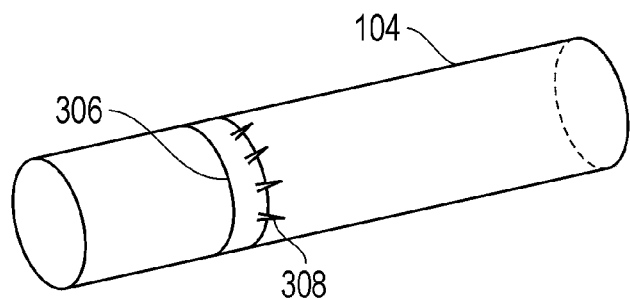
FIG. 10D depicts a roller tube with a ring having prongs on the exterior surface according to one embodiment of the present invention.

Looking first at FIG. 10A, a roller tube 104 is shown with a rough, sandblasted texture 300. In such embodiments, the sand may be shot under pressure onto a surface of the roller tube 104, leaving the surface with a texture similar to that of sand paper. Another texture is shown with reference to FIG. 10B which depicts a roller tube 104 formed with longitudinal ridges 302 along its exterior surface. FIG. 10C illustrates a roller tube 104 with a cross-hatch pattern 304 on its exterior surface. FIG. 10D illustrates a roller tube 104 that includes an annular ring 306 snapped onto the roller tube 104, the ring comprising a plurality of prongs 308 protruding from the ring's 306 surface and the ring 306 may be installed onto the roller tube 104 before or after delivery from factory. If the food products being heated on an array of roller tubes 104 are not rotating properly, the rings 306 may be utilized to grasp the food with the prongs 308. The rings 306 may generally be made of materials such as nylon, but other materials are contemplated.

Finally, another aspect of the present invention is the current control aspect, allowing for lower rated circuits to be used to power the roller grill assembly. In a conventional roller grill assembly with a warming tray, there is a current draw associated with each heating zone or the roller tubes and the bun warming area. This may force end users to use a larger-capacity circuit than desired or available. The present invention provides embodiments of a roller grill assembly, such as the roller grill assembly 100, which are configured such that the warming tray 108, depicted in FIG. 1, does not draw current unless one or more of the roller grill heating zones are not drawing any current.

According to the current-control aspect of the present invention, embodiments may be provided with a current control circuit in the roller grill assembly. The current control circuit may check to determine which relays are providing current to a particular set of roller grill tubes 104 or the warming area. For example, if the roller grill array is divided into two heating zones as depicted in FIG. 7 and a warming area is provided, there will be a total of three relays. Each of these relays, when activated, may result in a current draw of 5 amps per relay. Therefore, one aspect of the present invention is to control the relays such that the total current draw of the activated relays does not exceed a predetermined level. In the present example, it may be desirable to limit total current draw to 10 amps or less at all times, so the current control circuit will ensure that no more than two relays are activated at any given time. For example, the relay for one heating zone and the warming area may be activated, while the second heating zone relay will not be allowed to activate. Alternatively, the heating zones may have higher priority, and the warming area may be automatically deactivated when the second heating zone needs to activate. After understanding the principle of this aspect of the present invention based on the description herein, it is easy to understand that numerous other configurations and arrangements are possible without diverging from the spirit of the present invention.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A roller grill assembly, comprising:
   a housing;
   a plurality of roller tubes, each roller tube rotatably mounted to the housing, wherein each of the plurality of roller tubes is substantially hollow and defines a first opening at a first end of the roller tube and a second opening at the second end of the roller tube, and wherein each of the plurality of roller tubes includes a heating element for heating a surface of the roller tube;
   a first restrictor positioned orthogonal to a first opening at a first end of the roller tube, the first restrictor substantially covering each of the first ends of the plurality of roller tubes, wherein the first restrictor does not contact the first ends of the plurality of roller tubes;
   wherein the first restrictor creates a convective air stream within each of the roller tubes when the heating element is activated; and
   a plurality of temperature measuring probes located within the hollow portion of at least one roller tube of the roller grill assembly to measure the temperature of the convective air stream within the associated roller tube.

2. The roller grill assembly of claim 1, wherein the first restrictor is a restriction plate.

3. The roller grill assembly of claim 1, further comprising: a second restrictor positioned in a close proximity to a second opening at a second end of the roller tube, the second restrictor substantially covering each of the second ends of the plurality of roller tubes.

4. The roller grill assembly of claim 1, wherein at least two measuring probes are located in a single roller tube of the substantially hollow roller tube.

5. The roller grill assembly of claim 4, wherein the two measuring probes are temperature measuring probes and are used in combination to measure the temperature of the air within the associated roller tube.

6. The roller grill assembly of claim 1, wherein the plurality of measuring probes are positioned approximate the ends of the substantially hollow roller tubes and substantially approximate a central axis of the substantially hollow roller tubes and not in contact with the outer surface of the roller tubes.

7. The roller grill assembly of claim 1, wherein the plurality of roller tubes is divided into a first heating zone and a second heating zone.

8. The roller grill assembly of claim 5, wherein the first heating zone is controlled independent of the second heating zone.

9. A roller grill assembly, comprising:
a housing;
a plurality of roller tubes, each roller tube rotatably mounted to the housing and rotatably driven by a motor apparatus;
a plurality of heating elements associated with at least one of the roller tubes for heating the roller tube;
wherein the plurality of roller tubes are separated into independent cooking zones to permit temperature selection and control within each cooking zone; and
at least one measuring probe positioned in the air stream of the roller tubes and approximate an end of the roller tubes and not in contact with a surface of the roller tubes.

* * * * *